UNITED STATES PATENT OFFICE.

WILLIAM F. WARREN, OF ARDMORE, INDIAN TERRITORY.

CATTLE FOOD.

No. 842,281.    Specification of Letters Patent.    Patented Jan. 29, 1907.

Application filed February 15, 1906. Serial No. 301,281.

*To all whom it may concern:*

Be it known that I, WILLIAM F. WARREN, a citizen of the United States, residing at Ardmore, in the county of Chickasaw, Indian Territory, have invented certain new and useful Improvements in Cattle Food; and I do hereby declare the following to be a full, clear, and exact description of the invention, such as will enable others skilled in the art to which it appertains to make and use the same.

My invention relates to a new cattle food; and it consists in producing a nutritious food by mixing with a non-nutritious body, providing the requisite bulk, a certain quantity of highly-nutritious elements, whereby a food will be produced at a nominal cost and utilizing materials heretofore discarded. In accomplishing this result I employ as the body of the composition cotton-seed hulls and add thereto wheat-bran, comminuted cornstalks, cotton-seed meal, alfalfa-meal, and salt, proportioned as follows: cotton-seed hulls, approximately sixty per cent. and equal quantities of wheat-bran, comminuted cornstalks, alfalfa-meal, and cotton-seed meal, together constituting approximately forty per cent., and add thereto sufficient salt to season the same.

After the ingredients are properly proportioned they are placed together and thoroughly mixed by suitable machinery. In this manner I am enabled to provide a nutritious food in the form of a coarse powder at a very nominal cost and at the same time produce a food the nutritious qualities of which are practically the same as wheat-bran, comminuted cornstalks, cotton-seed meal, and alfalfa-meal when they are used alone.

It has been the custom heretofore to discard the cotton-seed hulls as useless, they having practically very little, if any, nutritious qualities; but by employing the same as a body and adding thereto the above-named foods I obviate the wastage heretofore encountered. It is a well-known fact that in order that certain animals may properly digest their foods their stomachs must be filled or expanded to a certain degree, and it is for this reason that I use a non-nutritious body or filler, as it will be readily seen that should the nutritious substances be used alone the bulk thereof would be so small that the stomach of the animal would not be filled, and should a large enough quantity of the nutritious food be used to induce proper digestion the animal would have consumed too much of the rich food, and thereby made ill. The alfalfa-meal is prepared from the dried alfalfa in any suitable manner.

What I claim is—

A stock-food composition in the form of a coarse powder comprising cotton-seed hulls in relative quantity sufficient to produce the requisite bulk, wheat-bran, comminuted cornstalks, cotton-seed meal, alfalfa-meal and salt mixed with the bulk of hulls substantially in the proportions stated to provide a perfect food ration, as set forth.

In testimony whereof I have signed my name to this specification in the presence of two subscribing witnesses.

WILLIAM F. WARREN.

Witnesses:
H. C. POTTERF,
IRA BRADEN.